3,140,268
CARVEABLE PLASTIC COMPOSITIONS CONSISTING ESSENTIALLY OF THERMOPLASTIC RESIN, SOLVENT, CARVEABLE WAX AND FINELY DIVIDED SOLID FILLER
Benjamin D. Halpern, Philadelphia, Pa., and Milton Kline, Lawrence, Mass., assignors to The Borden Company, New York, N.Y., a corporation of New Jersey
No Drawing. Filed July 28, 1959, Ser. No. 829,987
3 Claims. (Cl. 260—23)

This invention relates to carveable plastic compositions.

The application is a continuation-in-part of our co-pending application Serial No. 588,974, filed June 4, 1956, now abandoned.

In the preparation of contour maps, mock-ups and models, for example, there is needed a material that can be colored, cast, carved, and formed into sheets or laminated into blocks of high resistance to impact and to heat distortion. Common natural and synthetic waxes which are carveable do not have all other necessary properties.

This invention provides compositions that meet all the requirements. When formed into laminated blocks, the new compositions are particularly suitable for preparing solid contour maps. The special drills used for the cutting have a much longer useful life than with materials previously proposed for such maps. The compositions of this invention may also be cast into massive blocks for the carving of scale models of ships, automobiles and buildings and, in fact, are usable for models up to forty feet or so long and weighing as much as a ton.

It should be noted that sculpturing and cutting of plastic materials is an extremely delicate art and that materials heretofore proposed have been unsatisfactory. With our compositions, on the other hand, the ordinary fine sculpturing tools can be readily used to give a much higher degree of accurate detail than obtained with materials which typically were either so weak or brittle as to undergo objectionable chipping or so tough as to break the tool.

The materials of this invention comprise compatible blends of a film-forming thermoplastic synthetic resin, a normally carveable wax, a mutual solvent, i.e., one which is a solvent for both the resin and wax, and a large proportion of an interrupter of continuity of the mass of plastic, so as to facilitate the carving and also to prevent extension of any cracking initiated by the cutting tool. The basic blend may be modified by incorporation of conventional materials, such as stabilizers for the resin, antioxidants, inorganic pigments, organic dyes, and mixtures thereof.

The film-forming resins which can be used are thermoplastic. Examples are ethyl cellulose, methyl cellulose, cellulose esters, e.g., cellulose acetate, butyrate, and acetobutyrate; polyvinyl acetate; polystyrene; polyesters, such as those of maleic, o-, p-, iso-, and hexahydrophthalic anhydride and adipic or sebacic acid with ethylene, propylene, and butylene glycols; polyamides of adipic, sebacic, glutaric, azelaic and like acids with ethylene or hexamethylene diamine or with gamma-butyro- or deltra-valero-lactam; and polymeric esters of acrylic and methacrylic acid with monohydric alcohols having 1 to 8 carbons atoms as, for example, polymethylacrylate or polymethylmethacrylate; and mixtures thereof.

The carveable wax may be paraffin, microcrystalline (a petroleum wax of molecular weight about 400–700), chlorinated paraffin or naphthalene or other solid chlorinated hydrocarbon, or an ester type wax, examples of the latter being stearates and palmitates of any of the above named glycols, glycerine, sorbitol, and $C_{12}$–$C_{20}$ monohydric alcohols.

The mutual solvent must dissolve both the resin and the wax and be non-volatile. It is selected from the group consisting of amides such as stearamide, lauramide, and palmitamide, $C_{11}$–$C_{19}$ alkyl esters of castor oil fatty acids, hydrogenated terphenyl such as cyclohexylbenzene, bicyclohexyl, and HB-40 (hydrogenated mixture of diphenylbenzene, phenyldiphenyl, and triphenyl), and hydrogenated castor oil.

Finely divided powders serving as continuity interrupters can be calcium carbonate, gypsum, talc, titanium dioxide, alumina, diatomaceous earth, bentonite, wood flour, and other finely divided materials heretofore used in plastics as fillers only.

Conventional modifying ingredients which may be used include antioxidants such as ditertiary butyl paracresol; stabilizers such as epoxidized fatty glyceride oils and barium and cadmium salts of $C_6$–$C_{18}$ organic acids such as stearates, oleates, and naphthoates; non-volatile plasticizers such as phthalic, sebacic, and adipic acid esters of butanol, octanol, and dodecanol and tricresyl and triphenyl phosphates, oil soluble dyes; and other components, all added for their usual effect.

Suitable proportions are as follows:

| Component— | Parts by weight |
|---|---|
| Film-forming resin | 14–50. |
| Carveable wax | 7–25. |
| Mutual solvent | 8–20. |
| Continuity interrupter | 40%–70% of total composition. |
| Miscellaneous minor components | Usual, as needed. |

The proportion of the continuity interrupter or filler is critical. With less than about 40% of it, the finished composition is too tough and cohesive to be carveable. With more than 70%, the product is objectionably crumbly. The weight of powdered pigments, illustrated by the titanium dioxide or calcium carbonate above, is included as a part of the filler component.

As examples of this invention, the following compositions were prepared and found especially suitable as hot-melt carveable compositions. In these examples and elsewhere herein, proportions are expressed as parts by weight.

*Example 1*

| Component: | Parts |
|---|---|
| Polybutylmethacrylate ("Lucite 44") (resin) | 6.3 |
| Ethyl cellulose (resin) | 10.5 |
| Paraffin wax, M.P. 63°–66° C. (carveable wax) | 25.0 |
| Mixture of amides of stearic, palmitic, and oleic acids in the proportions of 70, 25 and 5 parts, respectively, M.P. 98° C., "Armid HT." (mutual solvent) | 6.3 |
| Powdered calcium carbonate (filler and pigment) | 48.0 |
| Epoxidized soybean oil (stabilizer) | 3.5 |
| Ditertiary butyl paracresol (antioxidant) | 1.0 |
| Organic red dye ("Resoform red BB") | 0.35 |

In compounding, the wax and resins were melted together with constant stirring at 150° to 170° C. While the melt was hot, the other ingredients, were added slowly, the whole being stirred until a uniform blend was formed.

The whole met was then cast into sheets to which any pressure sensitive adhesive for resin-wax compositions (e.g. polyisobutylene in toluene) was applied. The plastic sheets were found to have a softening temperature not below 80° C. in the ASTM Ball and Ring test, a Shore Durometer–A hardness over 90, and ASTM penetration of less than 4, and a coefficient of cubical expansion of $3$–$6 \times 10^{-5}$ inch/inch/degree F.

In the cold product, the fine particles of the continuity interrupter are separately surrounded by thin walls of plastic, i.e., by films, which are easily cut through. A flaw once started, soon terminates at the surface of one of the thin films. This structure also imparts local yieldability. Sheets of other colors were then laminated to this sheet to form multi-colored blocks.

It was found that the sheets or blocks could be easily carved with a knife, drill or needle, machined, and cast and had a high impact strength. Massive chunks could be formed and could be worked with a drill, rounder or stylus without breaking apart. Laminated blocks, when used for contour maps, allowed faster and more delicate results than hitherto obtained.

*Example 2*

| Component: | Parts |
|---|---|
| Polybutylmethacrylate (resin) | 7.8 |
| Maleic acid-glycerine-rosin alkyd ester, M.P. 143° C. (resin) | 9.6 |
| Paraffin wax, M.P. 63°–66° C. (carveable wax) | 13.0 |
| Hydrogenated castor oil, M.P. 86° C. (mutual solvent) | 6.1 |
| Powdered calcium carbonate (filler) | 52.0 |
| Titanium dioxide (pigment and filler) | 7.8 |
| Epoxidized soybean oil (stabilizer) | 3.5 |

This formulation was compounded in the same manner as in Example 1. The product was similar in general properties to that of Example 1, with the exception that the Example 2 composition was more white.

It was formed into sheets, solid blocks and laminated blocks and found to be easily carveable and workable with usual tools, without breaking apart.

*Example 3*

The composition and procedure of Example 1 are followed exactly except that the polybutylmethacrylate, ethyl cellulose, and modified alkyd resin there used are replaced by an equal weight of any of the other film-forming resins disclosed herein or mixtures thereof.

*Example 4*

The composition and procedure of Example 1 or 2 are followed except that the paraffin wax there used is replaced by an equal weight of any of the other carveable waxes disclosed herein.

*Example 5*

The procedure and composition of Example 1 are used except that the hydrogenated castor oil is replaced by an equal weight of any of the other mutual solvents shown herein.

*Example 6*

The procedure and composition of Example 1 are used except that the filler there used is replaced by an equal weight of any of the continuity interrupters or fillers listed above.

All of the compositions made in the several examples are useful for sculpturing as, for instance, in making the contour maps by the technique and procedure described.

It will be understood that it is intended to cover all changes and modifications of the examples of the invention herein chosen for the purpose of illustration which do not constitute departures from the spirit and scope of the invention.

We claim:

1. A solid dimensionally stable carveable plastic composition consisting essentially of 14–50 parts by weight of a thermoplastic resin component, 7–25 parts of a carveable wax compatible with the said resin, 8–20 parts of a nonvolatile mutual solvent for the said resin and wax, and a finely divided solid filler serving to interrupt the continuity of the plastic composition, the proportion of the filler being approximately 40%–70% of the total weight of the said composition, the said resin component being selected from the group consisting of ethyl cellulose, methyl cellulose, and cellulose acetate, butyrate and acetobutyrate, polyvinyl acetate, polystyrene, polyesters of maleic and o-, p-, iso- and hexahydrophthalic anhydrides and of adipic and sebacic acids with ethylene, propylene and butylene glycols, polyamides of adipic, sebacic, glutaric, and azelaic acids with ethylene and hexamethylene diamine and with gamma-butyro- and delta-valero-lactam, and polymeric esters of acrylic and methacrylic acids with monohydric alcohols having 1–8 carbon atoms, the said carveable wax being selected from the group consisting of paraffin, microcrystalline wax, chlorinated paraffin, chlorinated naphthalene, and stearates and palmitates of ethylene, propylene and butylene glycols, glycerine, sorbitol and $C_{12}$–$C_{20}$ monohydric alcohols, and the said non-volatile mutual solvent being selected from the group consisting of stearamide, lauramide, palmitamide, $C_{11}$–$C_{19}$ alkyl esters of castor oil fatty acids, cylcohexylbenzene, bicyclohexyl, a hydrogenated mixture of diphenylbenzene, phenyldiphenyl and triphenyl, and hydrogenated castor oil.

2. The composition of claim 1, the said resinous component being a polymeric ester of methacrylic acid with monohydric alcohols having 1–8 carbon atoms.

3. A solid stable carveable plastic composition consisting essentially of 14–50 parts by weight of polybutylmethacrylate, 7–25 parts of paraffin wax, 8–20 parts of hydrogenated castor oil, and calcium carbonate powder in the proportion of approximately 40%–70% of the total weight of the said composition.

References Cited in the file of this patent

UNITED STATES PATENTS

| 2,273,780 | Dittmar | Feb. 17, 1942 |
| 2,297,709 | Kauppi et al. | Oct. 6, 1942 |
| 2,921,867 | Shaw | Jan. 19, 1960 |

OTHER REFERENCES

"Polymer Processes," by Schildknecht, Feb. 28, 1956 (Interscience), page 568.

UNITED STATES PATENT OFFICE
CERTIFICATE OF CORRECTION

Patent No. 3,140,268           July 7, 1964

Benjamin D. Halpern et al.

It is hereby certified that error appears in the above numbered patent requiring correction and that the said Letters Patent should read as corrected below.

Column 2, line 64, for "met" read -- melt --; column 4, line 42, after "solid" insert -- dimensionally --.

Signed and sealed this 20th day of April 1965.

(SEAL)
Attest:

ERNEST W. SWIDER
Attesting Officer

EDWARD J. BRENNER
Commissioner of Patents